United States Patent
Schiebahn et al.

(10) Patent No.: US 10,814,906 B2
(45) Date of Patent: Oct. 27, 2020

(54) METHOD FOR OPERATING A POWER STEERING SYSTEM

(71) Applicant: Ford Global Technologies, LLC, Dearborn, MI (US)

(72) Inventors: Michael Schiebahn, Bornheim (DE); Helmuth Bosch, Leverkusen (DE); Peter W. A. Zegelaar, Heerlen (NL)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 15/924,247

(22) Filed: Mar. 18, 2018

(65) Prior Publication Data
US 2018/0273087 A1    Sep. 27, 2018

(30) Foreign Application Priority Data
Mar. 22, 2017 (DE) .................. 10 2017 204 777

(51) Int. Cl.
*B62D 5/04* (2006.01)
*B62D 5/06* (2006.01)
(Continued)

(52) U.S. Cl.
CPC .......... *B62D 5/0481* (2013.01); *B62D 1/286* (2013.01); *B62D 5/0463* (2013.01); *B62D 5/06* (2013.01); *B62D 15/025* (2013.01)

(58) Field of Classification Search
CPC .................................................. B62D 5/0481
See application file for complete search history.

(56) References Cited

U.S. PATENT DOCUMENTS

| | | | | |
|---|---|---|---|---|
| 5,258,914 A | * | 11/1993 | Schmitt | B60K 28/16 701/84 |
| 5,765,116 A | | 6/1998 | Wilson-Jones et al. | |

(Continued)

FOREIGN PATENT DOCUMENTS

| DE | 102016211622 A1 | 1/2017 |
|---|---|---|
| DE | 102015112755 A1 | 2/2017 |
| FR | 2780696 A1 | 1/2000 |

OTHER PUBLICATIONS

Gaedke, A. et al., "Driver Assistance for Trucks-from Lane Keeping Assistance, to Smart Truck Manuvering", Jun. 19, 2015, 6th International Munich Chassis Symposium.
(Continued)

*Primary Examiner* — Michael A Berns
(74) *Attorney, Agent, or Firm* — Raymond L. Coppiellie; Burgess Law Office, PLLC

(57) ABSTRACT

A method for operating a steering assist system of a motor vehicle, in which during a steering movement of the driver while driving the vehicle a steering assistance is determined. The steering assistance provided by an electro-hydraulic or electro-mechanical drive and may depend on the vehicle speed. The steering assistance providing a supportive force or a supporting moment to the steering system, wherein the provision of the steering assistance depends on the result of a judgment of whether there is a discrepancy between the determined steering assistance and the driver's steering intention based on a steering movement of the driver and a current value at least one steering parameter. A discrepancy exists between the steering assistance and the driver's intention to drive when a current value of a steering parameter exceeds a predetermined limit value. The steering parameters including a deviation between a steering assist torque and the driver steering torque exceeding a predetermined
(Continued)

limit or the steering angle exceeding a predetermined limit. In such cases, the steering assistance is adjusted or prevented.

9 Claims, 1 Drawing Sheet

(51) Int. Cl.
*B62D 15/02* (2006.01)
*B62D 1/28* (2006.01)

(56) References Cited

U.S. PATENT DOCUMENTS

| | | |
|---|---|---|
| 6,198,992 B1 | 3/2001 | Winslow |
| 8,095,271 B2 | 1/2012 | Lee |
| 8,170,751 B2 | 5/2012 | Lee et al. |
| 8,954,235 B2 | 2/2015 | Lee et al. |
| 9,073,576 B2 | 7/2015 | Lee et al. |
| 10,167,013 B2 * | 1/2019 | Kunihiro .............. B62D 5/0463 |

OTHER PUBLICATIONS

Pohl, J. et al, "A Lane Keeping Assist System for Passenger Cars-Design Aspects of the User Interface," Volvo Car Corporation, Paper No. 529.

\* cited by examiner

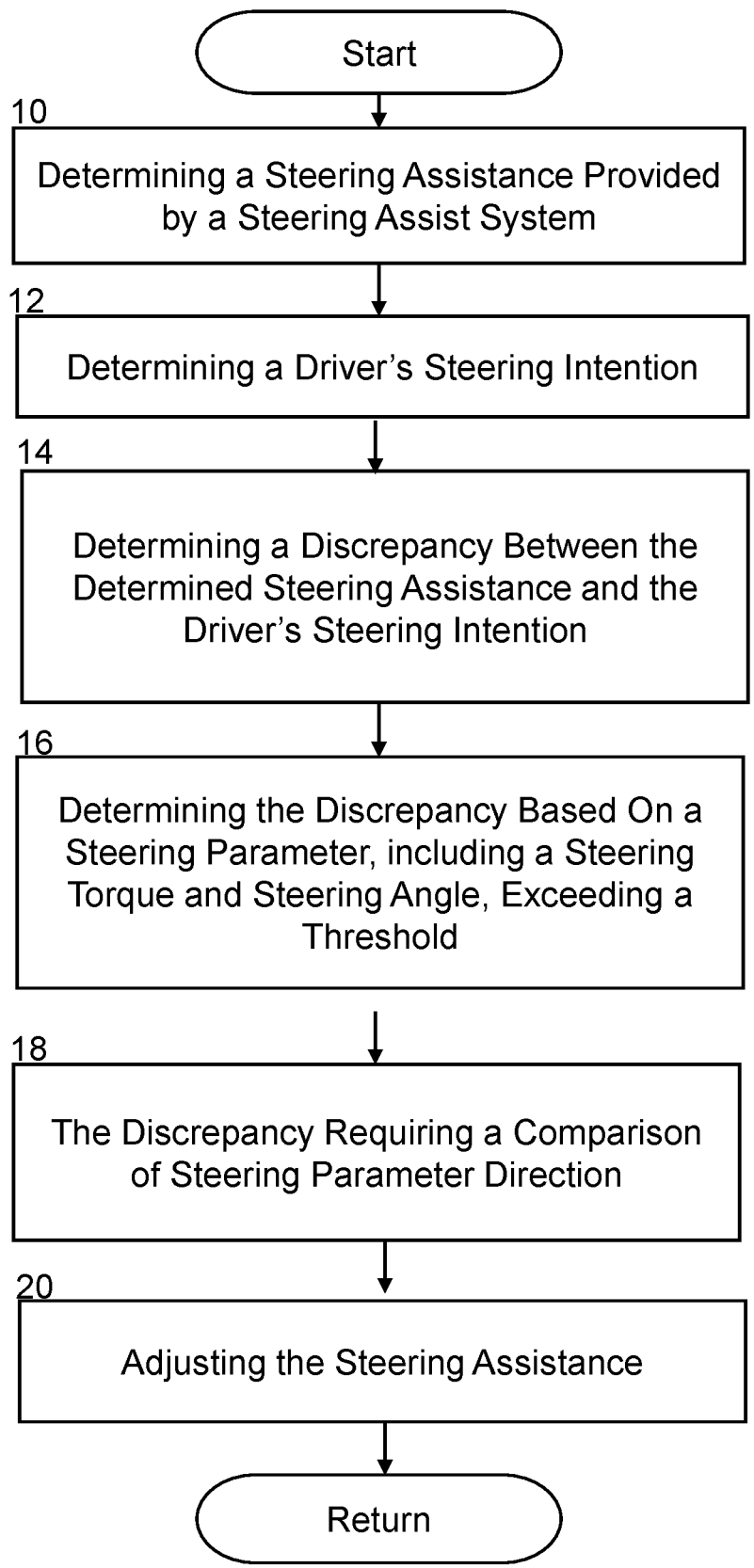

METHOD FOR OPERATING A POWER STEERING SYSTEM

CROSS-REFERENCE TO RELATED APPLICATIONS

Not Applicable.

BACKGROUND OF THE INVENTION

1. Field of the Invention

The invention relates generally to a method for operating a steering assist or assistance system of a motor vehicle; and more specifically to determining when to provide a steering assist or assistance to a driver during a steering movement by the driver.

2. Description of Related Art

Different driver assistance systems for use with automotive vehicles are known, such systems facilitating driving and vehicle control. For example, Lane Keeping Aid Systems (LKAS) are known, such systems warn a driver upon leaving, departing or straying from a lane. Such information may be relayed to the driver by an audible signal, but also by a vibration of the steering wheel. In some circumstances, the driver is not only warned about a change of lanes, but the change of lanes is automatically prevented.

Other assistance functions may also be provided by a power steering system, for example, lane keeping on an imaginary center line between road markings of a road, using a steering pre-load on the steering system to assist the driver of the vehicle in keeping to the imaginary center line position.

Such assistance functions may be automatically cancelled upon detecting driver intervention; including determining if the driver wishes to take manual control of the vehicle and cancel any autonomous driver assistance function of a motor vehicle. For example, a driver's action such as abrupt movement of the steering wheel, detected by a sensor, may signal driver intention.

SUMMARY OF THE INVENTION

A method for operating vehicle steering system of a motor vehicle having a steering assist system including a drive unit providing steering assistance in the steering system. The method including determining both the steering assistance provided by the steering assist system and a driver's steering intention. Based on the two determining a discrepancy between the determined steering assistance and the determined driver's steering intention wherein the driver's steering intention includes a current value of at least one steering parameter determined during a steering movement. Wherein a discrepancy between the determined steering assistance and the determined driver's steering intention requires a steering parameter of the driver exceeds a threshold; a deviation between a steering assist torque and a driver steering torque exceeds a predetermined limit; and a steering angle exceeds a predetermined limit. The discrepancy further requiring a comparison between a current direction of at least one steering parameter during a driver steering movement and a direction of the associated value of the steering assistance wherein differing directions are determined as a discrepancy. Upon determining a discrepancy adjusting the steering assistance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a flowchart illustrating one embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

FIG. 1 illustrates an embodiment of a method of the present invention, including determining and providing steering assistance during a steering movement of the vehicle driver. At step 10, the method includes determining a steering assistance provided by a steering assist system, with step 12, including determining a driver's steering intention. At step 14, the method including an assessment of whether there is a discrepancy between a determined steering assistance and the driver's steering intention. Step 16 includes determining the discrepancy based on a steering parameter, including a steering torque and steering angle exceeding a threshold. Step 18 requires a comparison of the steering parameter direction. Steering assistance is prevented if the assessment reveals a discrepancy between the steering assistance and the driver's steering intention. If so, the steering assistance is temporarily deactivated. It can also be provided that the steering assistance is not deactivated, but only adapted to the assumed driver's steering intention, see step 20. For example, the degree of the steering assistance can be reduced or increased.

Vehicle steering assist uses input from various vehicle sensors and computer modules to determine how much power assist should be applied to the steering input. Steering assistance may be controlled by controlling corresponding actuators of the electro-hydraulic or electromechanical drives system. In one example, a control unit evaluates any discrepancy and generates a corresponding control signal. The control unit is supplied with the necessary data and can be integrated into the central control unit of the motor vehicle or designed as a separate control unit.

The power steering system assists the driver during steering maneuvers, wherein a steering angle or steering torque is provided depending on an intended assistance function. This can be carried out by an electrohydraulic or electromechanical drive system, which applies an assisting force or an assisting torque to the steering system depending on the speed of the vehicle. The steering assist system reduces the force that a driver must apply for a steering maneuver.

The power steering system can also be used as an actuator for further driver assistance tasks. This includes, for example, automatic steering interventions in the case of ESP, parking assistance, and lane keeping assistance. Besides the reduction of the force for steering maneuvers, the power steering system can also undertake control functions. For example, keeping the vehicle in the center of a lane or carrying out path-based driving maneuvers. If the respective steering assistance vehicle trajectory/path or control trajectory/path does not coincide with the driver's steering intention, conflicts can arise. The exemplary method for operating a power steering system determines such conflicts as driver override to be accounted for by the steering assistance system. In this way, the steering assist system can be deactivated or turned off as required in a controlled way. With highly dynamic driving maneuvers, the timing between determining a driver override and the temporary deactivation of steering assistance is important and improved by the exemplary method.

Processes of different types can be identified as driver overrides, wherein a number of vehicle parameters are detected and analyzed. The method can use measurement data and algorithms of existing systems, which are already available for other functions. It can also consider data detected specifically for the method. In the case of evasive maneuvers, it is assumed that a driver wishes to avoid a collision with an object in front of the vehicle. It is therefore assumed that the driver of the vehicle wishes to steer out of the original lane into an adjacent lane and one there return to straight-line travel. The evasive maneuver can be taken as an example for the steering intention of a driver, for which suitable steering assistance is determined and provided to the steering system. Without driver override, the determined steering intention would, therefore, attempt to assist the driver during such an evasive maneuver. To presume an evasive maneuver by the driver as probable, further information of sensors, camera systems or other components of the vehicle are used. These detect an object in front of the vehicle and in doing so can also determine the dimensions and the distance from the vehicle.

There are various scenarios in which there is a driver override, wherein the driver's steering intention differs from the determined steering assistance for an evasive maneuver and causing a discrepancy or mismatch between the two. Assuming, for an evasive maneuver, that a driver changes from one lane to an adjacent lane, it is a so-called a "single-lane-change maneuver." Data relating to an object in front of the vehicle can be provided by suitable sensors and/or cameras. With host information, an algorithm can estimate a reference trajectory that the vehicle should take during such a maneuver to the adjacent lane. Host information includes measurement variables known in a vehicle equipped with the driver assistance system. This includes in particular the speed of the vehicle, the yaw rate, the lateral acceleration, the longitudinal and lateral distances from the vehicle ahead and potential collision object, the longitudinal and lateral relative speed, information about whether there are still further objects on the adjacent lane in front of or behind the vehicle, the steering angle, the angular rate of the steering, the steering torque in relation to the steering wheel or the steering column, and/or the width of the vehicle ahead.

The actual driving trajectory of the vehicle can be determined from current motion data of the vehicle. Considering a certain path tolerance, deviations between the actual driving trajectory and the reference trajectory can occur if the driver steers either too much or too little. This can be assessed as an indicator of a driver override. Here, an actual position of the vehicle in the sideways direction and an estimated reference position of the vehicle in the sideways direction are compared with each other. If the difference between the positions exceeds a defined limit value, this is assessed as a driver override.

One embodiment includes determining both the actual driving trajectory of the motor vehicle during a steering movement by the driver and a reference trajectory that the motor vehicle should follow during a change from one lane to an adjacent lane. A deviation between the actual driving trajectory and the reference trajectory that lies outside a tolerance range is assessed as a discrepancy between the steering assistance and the driver's steering intention. The steering system accounts for the discrepancy by adapting the steering assistance to the actual driving trajectory or even temporarily deactivating the steering assistance. The tolerance range; i.e., the allowed deviation between the actual driving trajectory and the determined reference trajectory, can be selected variably over the deviation path. Further, the tolerance range may be different for an oversteering vehicle and an understeering vehicle; i.e., for positive or negative path deviations. The allowed lateral deviation is for example between 0.5 m-1 m for vehicles having widths of 2 m-3 m.

A further embodiment takes into account that a driver usually applies a significant steering angle during an evasive maneuver. Following the first steering angle, the driver must continue the steer-out action to carry out the evasive maneuver. The driver could also change his intention and keep the vehicle in the original lane. Here, the driver carries out no further steer-out actions after the first steering angle. Such a steer-out action can be described as a permanent increase in the driver's steering wheel angle during the steer-out phase. If the driver's steering wheel angle no longer increases after a first steering angle, the driver has not carried out any further steer-out actions, indicating a desire to remain in the original lane. This can be assessed as a discrepancy between the determined steering assistance and the driver's steering intention.

Another embodiment determines whether the driver's steering wheel angle is increasing during a steering movement by the driver, a lack of an increase in the driver's steering wheel angle is assessed as a discrepancy between the determined steering assistance and the driver's steering intention. To check the increase in the driver's steering wheel angle, the steering wheel angle is continuously detected, and integration of the driver's steering wheel angle is carried out. Depending on the position of the vehicle in the longitudinal direction, the resulting values should not fall below a defined limit value. If they fall below the limit value, this is assessed as a driver override. The steering system accounts for driver override by adapting or even temporarily deactivating the steering assistance. The limit value can be determined experimentally. For example, depending on the deviation path traveled, the value is approximately between 0.02-0.26 radians, which should be reached during longitudinal travel of 0.1-0.4 m in order not to detect driver override.

A further scenario for a driver override can include the driver not only wishing to change into an adjacent lane for an evasive maneuver but to deviate even further, for example, more than one lane over. In this case, the sideways movement of the vehicle would be significantly greater than for an evasive maneuver into the adjacent lane. As the timing is of particular importance, it is important during the detection of a driver override to detect this as soon as possible. Therefore, it can be advantageous not to compare an actual sideways movement of the vehicle with a lateral position limit value, but with an estimated sideways movement. In one embodiment of the invention, it is therefore provided that a sideways movement of the motor vehicle is estimated during a steering movement by the driver and that exceeding a limit value by the estimated sideways movement of the motor vehicle is assessed as a discrepancy between the steering assistance and the driver's steering intention. The steering system takes account of driver override even by adapting or even temporarily deactivating the steering assistance.

When determining the estimated sideways movement, the vehicle state is taken into account. In particular, the vehicle driving dynamics are considered, whereby the estimated sideways movement is determined with a preview algorithm. Said preview algorithm uses different parameters. For example, the sideways movement is estimated based on the driving dynamics using the speed of the vehicle, the yaw rate, and/or the steering angle. If the estimated position exceeds a defined sideways movement, this is assessed as driver override. For example, depending on the speed of the vehicle and using the yaw rate, a lateral distance is estimated at which the traveling vehicle will be after 0.35-0.6 seconds. If the vehicle has moved laterally by more than 0.8 m on the evasion route during the observation, i.e., to the third lane, this is assessed as driver override.

Steering parameters can also be used to detect a driver override since these can oppose a driver's steering intention. For example, a deviation can occur between a steering assistance torque and the steering torque applied by the driver to the steering wheel. If such deviation exceeds a defined limit value, this indicates that the steering parameters do not correspond to the driver's steering intention. This is not only true for the steering torque, but also for the steering angle and the direction of a steering parameter.

In one embodiment of the invention, the current value for at least one steering parameter is determined during a steering movement by the driver and is compared with an associated value of the determined steering assistance, a difference of a steering parameter value from the associated value of the steering assistance lying outside a tolerance range is assessed as a discrepancy between the steering assistance and the driver's steering intention. Here, different deviations are considered. For example, during a steering movement by the driver, the current value of at least one steering parameter can be determined. Exceeding a limit value by the current value is then assessed as a discrepancy between the steering assistance and the driver's steering intention. Further, the current direction of a steering parameter is determined and is compared with the direction of the associated value of the steering assistance. Differing directions can be assessed as a discrepancy between the steering assistance and the driver's steering intention.

A single detected deviation can suffice for determining a discrepancy to be considered. Preferably, however, several deviations must be provided cumulatively to be able to reliably conclude a driver override. In particular, monitoring of steering torques can be provided, i.e., monitoring of whether the driver is "battling" against an assisting steering torque and opposing it. The monitoring engages, if for example, the difference between the driver's steering torque and the assisting steering torque exceeds 5 Nm for a minimum force of 1 Nm. For example, the steering angle should be at least 20 degrees for the criterion to be considered.

In one embodiment, during a driver's steering movement the method assesses a discrepancy between the steering assistance and the driver's steering intention. Upon determining a deviation between a steering assistance torque and the driver steering torque exceeds a certain limit, and the steering angle exceeds a certain limit, the steering movement of the driver may be judged as a discrepancy between the steering assistance and the driver's intention. Other conditions include if the driver steering torque exceeds a certain limit, the steering assist torque and the driver steering torque have different directions, or the driver's steering torque and the steering angle have different directions.

Meeting one or all of these criteria may be considered driver override, which justifies an adjustment or temporary deactivation of steering assistance.

The disclosed method provides for operating the power steering of a vehicle in a manner wherein driver overrides can be detected and can be advantageously considered by the power steering. The detection of driver override is preferably used not to deactivate an autonomous driver assistance function but to temporarily adapt the already provided steering assistance to current conditions while the vehicle is driven. In the case of dynamic evasive maneuvers, this increases the safety and the ride comfort. Here, the mechanisms described for detecting a driver override can be used by the method individually or even combined with each other.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating a steering assistance system of a motor vehicle, the steering assistance system providing a steering assistance during a steering movement by a driver including:
    providing the steering assistance based on at least one of a plurality of discrepancies occurring between a determined steering assistance and a driver's steering intention;
    the driver's steering intention including a current value of at least one steering parameter determined during the steering movement;
    said steering parameter exceeding a threshold by a predetermined value judged to be at least one of the plurality of discrepancies occurring between the determined steering assistance and the driver's steering intention if a deviation between a steering assist torque and a driver steering torque exceeds a predetermined limit, and a steering angle exceeds a predetermined limit; and
    adjusting the steering assistance.

2. The method according to claim 1 wherein during a steering movement by the driver an actual driving trajectory of the motor vehicle and a reference trajectory, which follows the motor vehicle when changing from one lane to an adjacent lane, are determined; and
    a deviation between the actual driving trajectory and the determined reference trajectory outside a tolerance range is determined as at least one of the plurality of discrepancies occurring between the determined steering assistance and the driver's steering intention.

3. The method according to claim 1 including during the steering movement by the driver determining whether the driver's steering wheel angle is increasing wherein a lack of an increase in the driver's steering wheel angle is determined as at least one of the plurality of discrepancies occurring between the determined steering assistance and the driver's steering intention.

4. A method for operating a steering assistance system of a motor vehicle, the steering assistance system providing a steering assistance during a steering movement by a driver including:

providing the steering assistance based on at least one of a plurality of discrepancies occurring between a determined steering assistance and a driver's steering intention;

the driver's steering intention including a current value of at least one steering parameter determined during the steering movement;

said steering parameter exceeding a threshold by a predetermined value judged to be at least one of the plurality of discrepancies occurring between the determined steering assistance and the driver's steering intention if a deviation between a steering assist torque and a driver steering torque exceeds a predetermined limit, and a steering angle exceeds a predetermined limit; and during a steering movement by the driver estimating a sideways movement of the motor vehicle wherein exceeding a limit value of the estimated sideways movement of the motor vehicle is determined as a discrepancy between the steering assistance and the driver's steering intention.

5. The method according to claim 4 wherein the sideways movement is estimated using at least a speed of the vehicle, a yaw rate, and the steering angle.

6. A method for operating a steering assistance system of a motor vehicle, the steering assistance system providing a steering assistance during a steering movement by a driver including:

providing the steering assistance based on at least one of a plurality of discrepancies occurring between a determined steering assistance and a driver's steering intention;

the driver's steering intention including a current value of at least one steering parameter determined during the steering movement;

said steering parameter exceeding a threshold by a predetermined value judged to be at least one of the plurality of discrepancies occurring between the determined steering assistance and the driver's steering intention if a deviation between a steering assist torque and a driver steering torque exceeds a predetermined limit, and a steering angle exceeds a predetermined limit; and wherein the current direction of the steering parameter is determined during a steering movement and is compared with the direction of the determined steering assistance, wherein differing directions are determined as at least one of the plurality of discrepancies occurring between the determined steering assistance and the driver's steering intention.

7. The method according to claim 6 wherein during a steering movement by the driver a discrepancy between the determined steering assistance and the driver's steering intention is determined when;

the driver steering torque exceeds a limit value, the steering assist torque and the driver's steering torque have different directions, and the driver's steering torque and the steering angle have different directions.

8. The method according to claim 6 including the step of deactivating the steering assistance.

9. The method according to claim 6 including the step of adjusting the steering assistance.

* * * * *